United States Patent [19]

Seko et al.

[11] Patent Number: 5,677,819
[45] Date of Patent: Oct. 14, 1997

[54] MAGNETIC DISK HAVING IMPROVED SERVO AREA FOR PROTECTING EQUAL TIME INTERVAL CHARACTERISTICS AND FOR PREVENTING AZIMUTH LOSS

[75] Inventors: Satoru Seko, Kanagawa; Toru Takeda, Saitama, both of Japan

[73] Assignee: Sony Corporation, Tokyo, Japan

[21] Appl. No.: 511,140

[22] Filed: Aug. 4, 1995

Related U.S. Application Data

[63] Continuation of Ser. No. 176,922, Jan. 3, 1994, abandoned.

[30] Foreign Application Priority Data

Jan. 7, 1993 [JP] Japan ................................. 5-016972

[51] Int. Cl.$^6$ ................................................. G11B 5/82
[52] U.S. Cl. ................................................. 360/135
[58] Field of Search ................................. 360/135, 133, 360/76

[56] References Cited

U.S. PATENT DOCUMENTS

| | | | |
|---|---|---|---|
| 4,633,343 | 12/1986 | Maury | 360/76 |
| 4,688,118 | 8/1987 | Knowles | 360/77.05 |
| 5,138,511 | 8/1992 | Hoshimi | 360/135 |

*Primary Examiner*—A. J. Heinz
*Attorney, Agent, or Firm*—Lise A. Rode, Esq.; Jerry A. Miller

[57] ABSTRACT

A magnetic disk is provided with a track divided by servo areas to record servo signals and data areas to record data signals. Within the servo area, an exclusive region is previously formed to specifically record the servo signal. In one embodiment, the servo region is formed along the moving locus of a magnetic head while writing and reading data, which extends both along the radial direction and peripheral direction of the magnetic disk.

10 Claims, 15 Drawing Sheets

MAGNETIC DISK HAVING IMPROVED SERVO AREA FOR PROTECTING EQUAL TIME INTERVAL CHARACTERISTICS AND FOR PREVENTING AZIMUTH LOSS

This is a continuation of application Ser. No. 08/176,922 filed on Jan. 3, 1994 abandoned which is hereby incorporated by reference.

BACKGROUND

1. Field of the Invention

The present invention relates to a magnetic disk. It particularly relates to the magnetic disk which is suitable for a hard disk in an computer equipment to store data and/or software programs.

2. Background of the Invention

There have been proposed two kinds of hard disks. The first disk requires formatting procedure before the use by a magnetic head for writing and reading data. The second disk has previously-assigned area which are area to store data and another area to store servo signal. In the servo area, recording area is formed exclusively for recording servo signal. The servo signal could have been previously recorded in the exclusive area.

The first disk requires the so-called SERVO WRITE procedure in which the magnetic head should be precisely positioned, divide servo area and data area and record the servo signal within servo area. This procedure should have been completed before the essential operation for writing and reading data. However, the SERVO WRITE procedure takes relatively long time. Without this format, writing and reading data can not be performed.

On the other hand, the second disk has been already performed the formatting. It becomes possible to immediately start writing and reading data. Since the technology in the field of optical disk can be applied for this formatting procedure, fine position control and high precision formatting procedure become possible.

FIG. 13 represents the format on the second kind of disk. As shown in the drawing, plurality of tracks are concentrically formed on a magnetic disk 1. Each of tracks are divided at a certain distance alternatively by servo area 2 and data area 3 so that the servo area 2 and data area 3 can be radially extended. This magnetic disk rotates around its center 4 at a constant angular velocity.

Servo markings (SM), Clock markings (CM) and Access codes (AC), etc. are previously recorded in the servo area. The servo markings (SM) are made of a pair of markings for the purpose of tracking control so that the magnetic head can precisely scan the track for writing and reading data. A mark of the pair is formed at an offset position along the direction shown by an arrow toward (B) and another mark is formed at another offset position along the direction shown by another arrow toward (A). The pair of markings are located at a certain distance along a longitudinal direction of a track.

The clock markings (CM) are recorded continuously across the plurality of tracks for generating clock signal as a reference for writing and reading data.

The access codes (AC) are recorded as a combination of markings over the adjacent tracks. They are alternatively called by Gray codes of the coding system in which a Hamming distance between a certain code and an adjacent code always becomes one. These codes are utilized for identifying a certain track at high speed.

There are guard bands formed between each of the tracks. The magnetic head for writing and reading data on the magnetic disk 1 is driven by the method described in FIGS. 14 and 15.

In an apparatus shown in FIG. 14, a magnetic head 13 is attached at an end of arm 11 which can pivot around an axis 12. Opposite to the location of magnetic head 13, a voice coil 15 is attached at an another end of arm 11. A permanent magnet 14 is deposed beneath the voice coil 15. Through a driver circuit 16, predetermined driving current is supplied to the voice coil 15 which is disposed in the magnetic field generated by the permanent magnet 14. Due to the electromagnetic force applied to the voice coil 15, the arm 11 pivots around the axis 12. The magnetic head 13 moves on a path 21 which is an arc 2 around the axis 12 passing through the center 4 of magnetic disk 1. The magnetic head 13 is driven by this method of pivoting the arm 11. It can be realized by the simple mechanism.

On the other hand, by the driving method shown in FIG. 15, a magnetic head 13 moves along a straight line. In this apparatus, the head 13 is mounted at an end of arm 31 and a voice coil 34 is attached at another end of the arm 31. Magnetic flux is generated by permanent magnet 32, transferred through yoke 33 and then applied to the voice coil 34. Due to electromagnetic force applied to the voice coil 34, the magnetic head 13 moves back and forth along the line 22. The line 22 is drawn with an offset distance (d) from the center 4 of magnetic disk 1.

By giving such an offset and also providing a magnetic gap of the head 13 with some Bent Angle (relative angle between a magnetic gap and locus of the head's moving, a height or a floating amount of the magnetic head 13 from the magnetic disk 1 can be kept constant at inner and outer peripheral.

The magnetic head 13 works as a floating head which is floated and disposed at a position with a certain distance from the disk 1 due to air flow generated as the magnetic disk 1 rotates at a high speed. Since the magnetic disk 1 rotates at a constant angular velocity (CAV), the relative speed between the magnetic head and the magnetic disk at its outer peripheral becomes larger than its inner peripheral. The buoyancy to the magnetic head 13 becomes also larger on outer peripheral than inner peripheral. If the bent angle of magnetic head 13 wasn't provided (the bent angle became zero), the floating height (the distance from disk 1) of the magnetic head 13 would become larger at the outer peripheral than the inner peripheral. It would become difficult to write and read the signal in particular with high frequency (short wavelength).

A Skew Angle (relative angle between a line which is perpendicular to the magnetic gap of magnetic head and a direction along the track) is arranged to become zero at the most inner track so that the magnetic gap can extend perpendicular to the most inner track. Since the magnetic head 13 moves along the line 22 which has an offset with distance (d), the skew angle becomes larger as the head moves towards the outer peripheral.

The buoyancy which is generated out of the rotating magnetic disk 1 becomes the largest when the magnetic gap of magnetic head 13 becomes perpendicular to a direction along the track. When the relative angle with the track becomes small, in other words, when the skew angle becomes large, the buoyancy doesn't effectively work to the magnetic head 13. This means the buoyancy working to the magnetic head 13 at the outer peripheral becomes small and the floating height would become small as the result. However, the relative speed between the magnetic head 13 and the magnetic disk 1 becomes faster at the outer peripheral disk. The floating height of magnetic head 13 can be maintained at a constant both at the inner and outer peripheral by limiting the generating buoyancy by means of the bent angle. The recording and reproducing characteristics for the high frequency signal is therefore maintained at a constant both at the inner and outer peripheral.

It can be similarly realized that the floating height is maintained at a constant both at the inner and outer peripheral in the example shown in FIG. 14 by providing the magnetic head 13 with such a bent angle.

The following problems are recognized when data is writing and reading data by the method shown in FIG. 14 or 15 from the magnetic disk 1 in which the servo area 2 and data area 3 are formed along the radial direction.

While SEEK operation with the movement of magnetic head 13 between inner peripheral to outer peripheral, the magnetic head 13 moves not only along the radial direction but also along the track (peripheral) direction. As the result, timing for generating signal out of the servo area 2 becomes earlier than the original period when the head moves toward the outer peripheral side. Or it becomes later when the head moves toward inner side. Therefore, it invites risk that the characteristics of Equal Time Interval is completely broken while rotating a disk and Phase Locked Loop (PLL) for detecting clock goes out from its locked operation.

To detect servo signal, the detected timing of a previous servo signal is used as a reference so as to generate a window to cover the timing for the next servo signal. Since this window is utilized to detect the servo signal, there is risk that it becomes unable to detect the servo signal when the characteristics of Equal Time Interval is completely broken.

Furthermore, the magnetic gap of magnetic head 13 is not always extended along the direction which is perpendicular to the track direction. It causes the azimuth loss. The reproducing characteristics for shorter wavelength signal becomes worse and enough reproducing output cannot be obtained.

SUMMARY OF THE INVENTION

It is, therefore, an object of the present invention to resolve the problems mentioned above.

It is another object of the present invention to provide a magnetic disk by which the characteristics of Equal Time Interval can be secured while SEEK operation.

It is also an object of the present invention to provide a magnetic disk by which it can be avoided that the PLL for clock generation goes out from its locked operation.

It is a further object of the present invention to provide a magnetic disk by which the azimuth loss can be decreased.

In one aspect of the present invention, a magnetic disk is provided with a track divided by servo area to record servo signal and data area to record data signal. Within the servo area, an exclusive region is previously formed to specifically record the servo signal. The servo region is formed along the moving locus of a magnetic head while writing and reading data, which extends both along the radial direction and peripheral direction of the magnetic disk.

In another aspect of the present invention, a magnetic disk is provided with a track divided by servo area to record servo signal and data area to record data signal. Within the servo area, an exclusive region is previously formed to specifically record the servo signal. The servo region is formed along a curve to which the magnetic gap of a magnetic head with a bent angle always becomes tangent in all tracks of the magnetic disk.

In accordance with the one aspect of present invention, the servo region extends along either the arc from the axis of pivotal arm or the offset line of linear arm for a magnetic head so that the characteristics of Equal Time Interval can be secured while SEEK operation.

In accordance with the another aspect of present invention, the data such as Grey Code can be read out by the magnetic gap of a magnetic head with a bent angle, which is always perpendicular to all tracks. Therefore, it becomes possible to prevent azimuth loss while reading.

DESCRIPTION OF THE INVENTION

Figure 1:
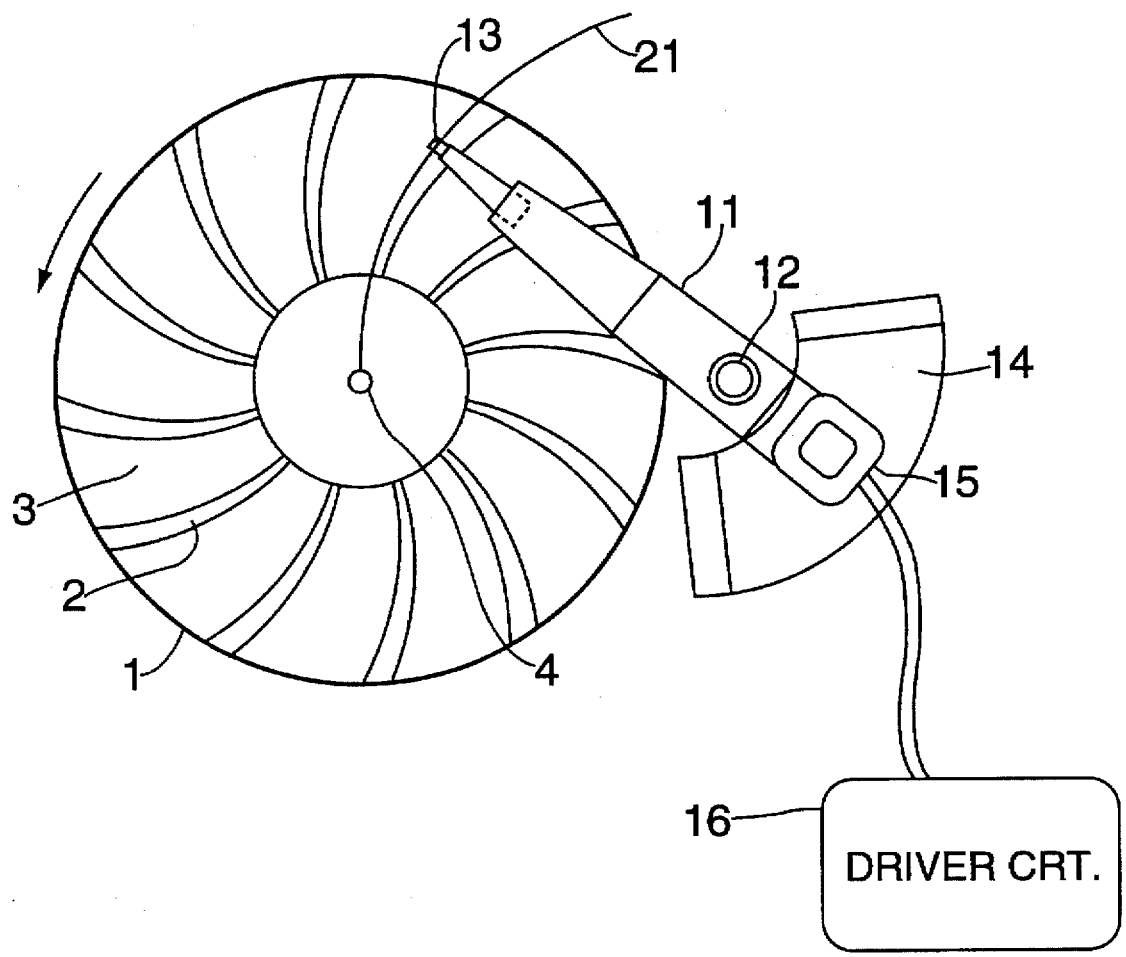
FIG. 1 shows a plan view of a magnetic disk as an embodiment of the present invention.

FIG. 1 shows an embodiment of a magnetic disk of the present invention with a driving mechanism for a magnetic head 13 for recording and reproducing data in a data area of the disk. It includes the same numeral suffix on the corresponding portions as the previously proposed disk.

In the magnetic disk 1, its servo area 2 and data area 3 are formed along the moving locus 21 of the magnetic head 13. Other structure is the same as the previously proposed disk.

Figure 2:
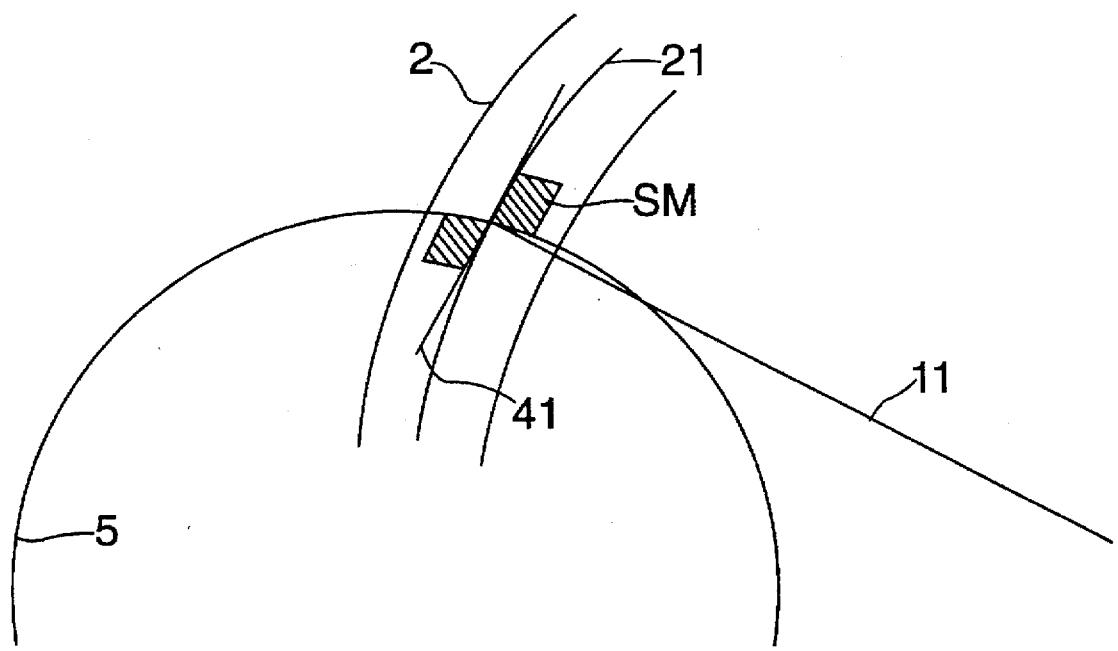
FIG. 2 is a drawing explaining a shape of servo mark SM in the servo area 2 in FIG. 1.
Figure 3:
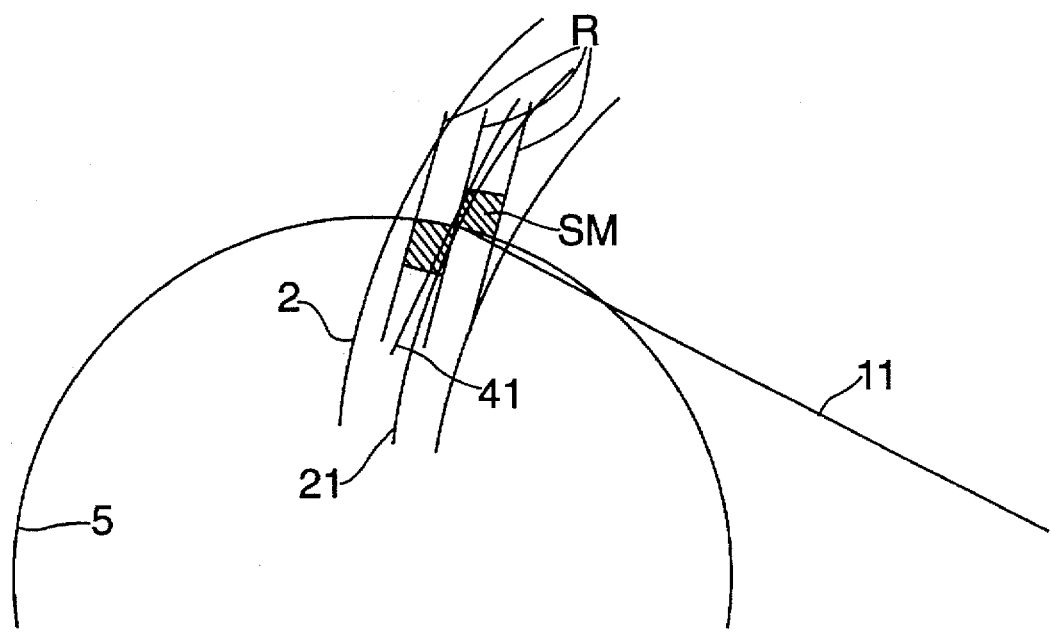
FIG. 3 is a drawing explaining another shape of servo mark SM.
Figure 4:
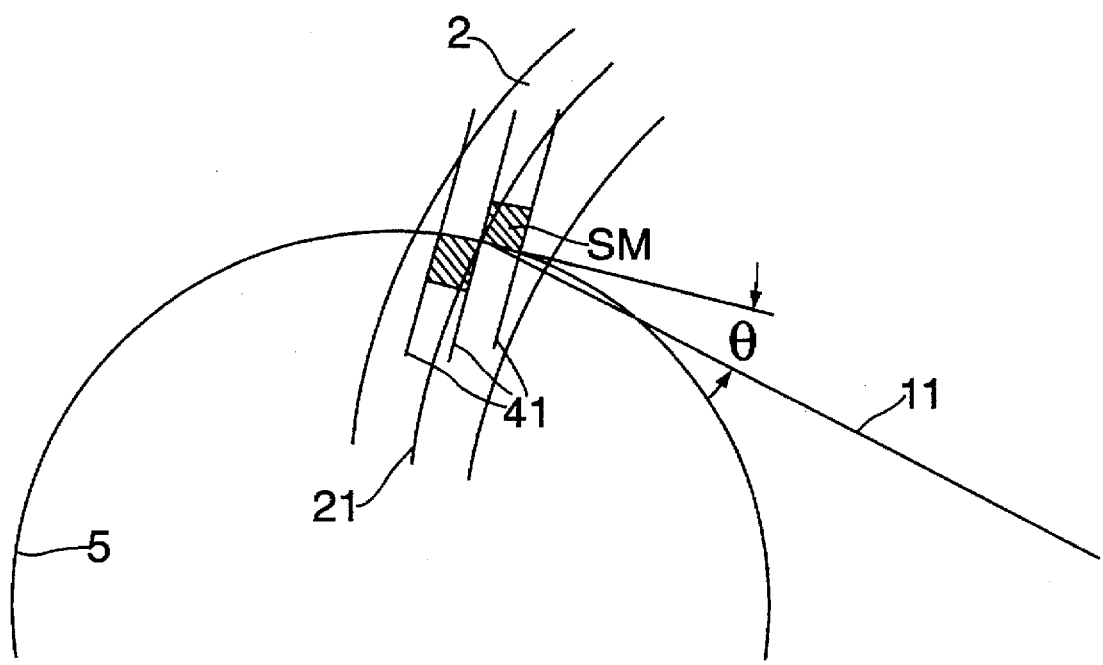
FIG. 4 is a drawing explaining a further shape of servo mark SM.

In FIGS. 2 to 4, a record region of servo marking is described more in detail. It is a region exclusively for recording servo signal in the servo area 2.

An embodiment shown in FIG. 2 has servo marking SM as almost rhombic patterns. They are formed by a curve along the moving locus 21 of the magnetic head 13 being rotated with an arm 11 and another curve along tracks of the magnetic disk 1. As the servo marking SM is exaggerated larger compared with radius of the locus 21 and the track, each side of the servo marking SM is represented by curves. In fact, a length of side of this servo marking is extremely small compared with the radius of locus 21 and track. Therefore, it is substantially surrounded by lines.

In accordance with this embodiment, the servo marking SM is deposed along the moving locus 21. Therefore, the characteristics of Equal Time Interval is not broken and the locked condition of PLL for generating clock is not lost while the SEEK operation. When the magnetic head 13 with no bent angle is utilized for recording and reproducing, the magnetic gap line 41 which is parallel to the magnetic gap of magnetic head 13 is tangent with the moving locus. Therefore, there is no chance to generate azimuth loss.

In an embodiment shown in FIG. 3, servo marking SM in the servo area is formed also along the moving locus. However, each servo marking itself is surrounded by curves which are parallel to the track and lines which are parallel to the radius lines (R) as previously proposed disk.

In this embodiment, the servo marking SM is disposed along the moving locus 21. Therefore, the almost same result can be expected as the embodiment shown in FIG. 2.

However, when the magnetic head 13 with no bent angle is utilized for recording and reproducing, the magnetic gap line 41 becomes not parallel to the edged line of servo marking SM. Therefore, it causes to generate azimuth loss.

In another embodiment shown in FIG. 4, servo marking SM in the servo area is formed also along the moving locus. However, each servo marking is surrounded by curves which are parallel to the track and lines which are parallel to the magnetic gap lines 41.

In this embodiment, the servo marking SM is disposed along the moving locus 21. Therefore, it can maintain the characteristics of Equal Time Interval while the SEEK operation, similar to the embodiment shown in FIG. 2. When the magnetic head 13 with a certain bent angle θ is utilized for recording and reproducing, it can make the azimuth loss zero.

Figure 5:
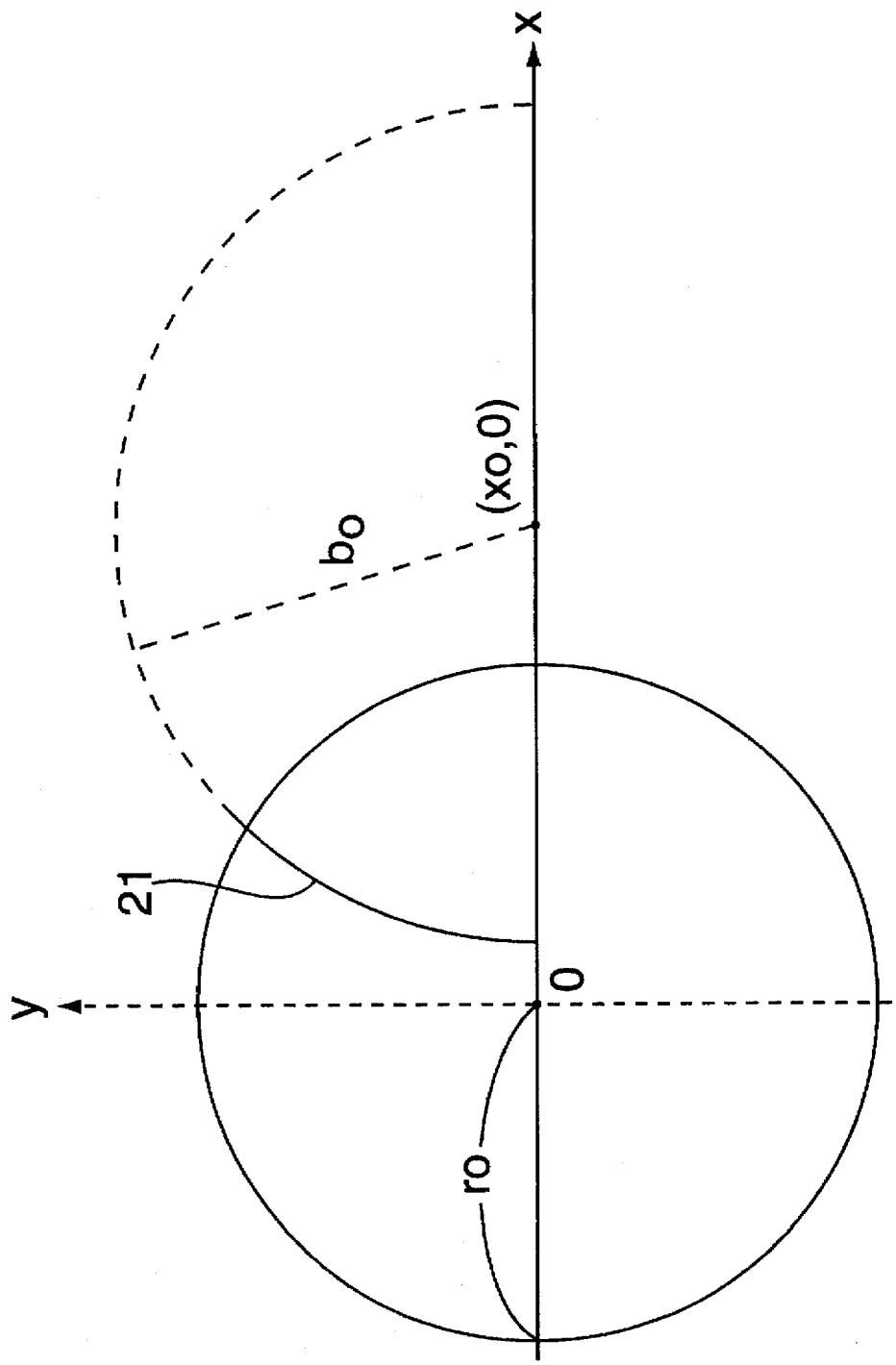
FIG. 5 shows another plan view of the magnetic disk as shown in FIG. 1 with X-Y coordinates.

FIG. 5 shows a plan view of the magnetic disk as shown in FIG. 1 with X-Y coordinates. The center of disk 1 is located at the origin and the pivotal axis of arm 11 is located at $(x_o, 0)$. When the distance between the axes, the radius of arm 11, and the radius of disk 1 are respectively represented as $(x_o)$, $(b_o)$, and $(r_o)$, the moving locus 21 of magnetic head 13 can be represented as follows:

$$(x-x_o)^2 + y^2 = b_o^2$$

provided that $(x_o - r_o) < b_o < (x_o + r_o)$.

As an example, $x_o = 40.5$ mm, $b_o = 39.0$ mm and $r_o = 32.0$ mm with the most outer track at 30.0 mm and the most inner track at 16.0 mm.

Figure 6:
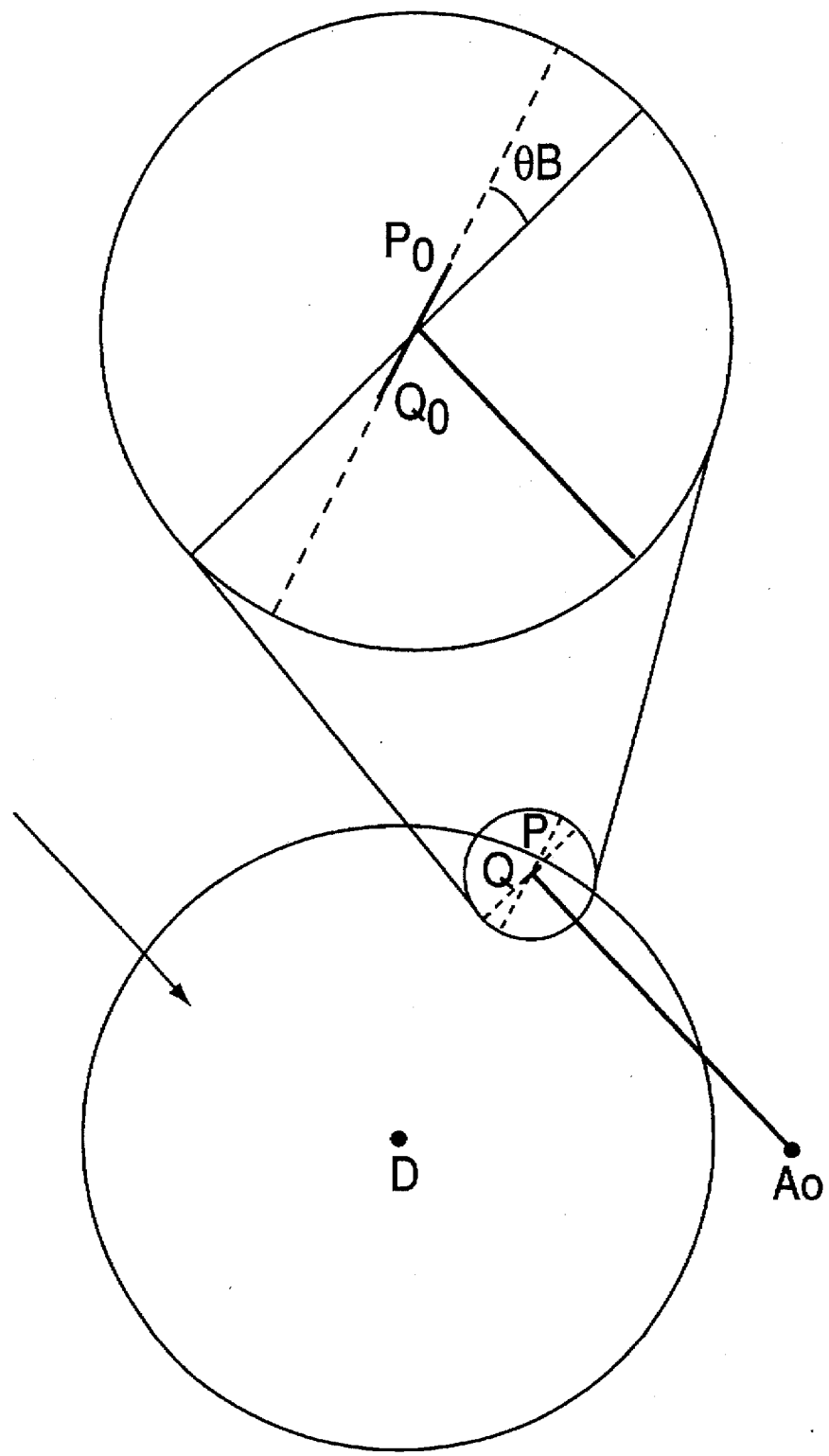
FIG. 6 shows a drawing explaining a bent angle of a magnetic gap of magnetic head of the present invention.
Figure 7:
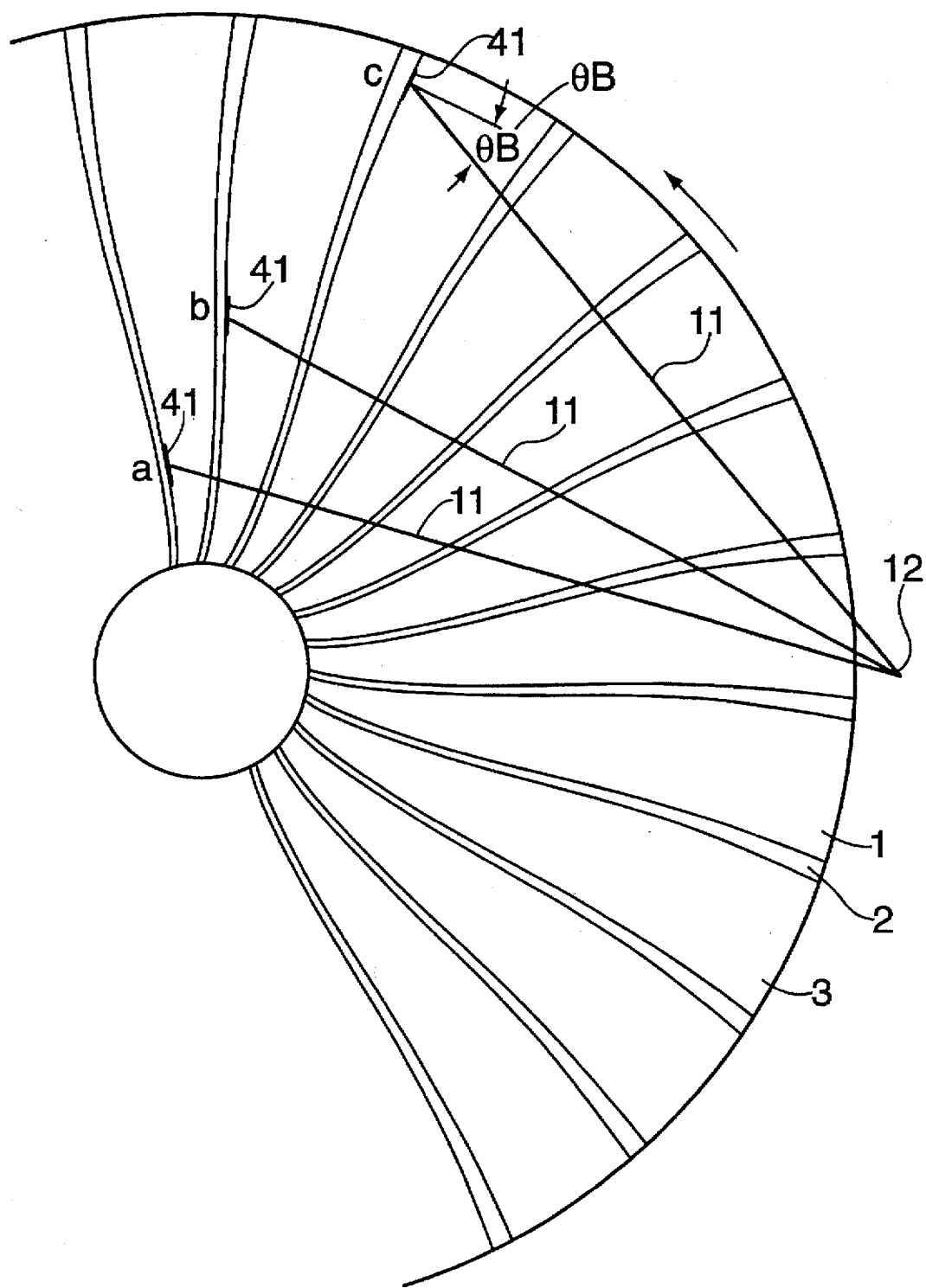
FIG. 7 shows a plan view of a magnetic disk as another embodiment of the present invention.

By the embodiment shown in FIG. 2 in which the servo markings are surrounded by pivoting locus and track, the time for reading the servo pattern can be maintained at constant regardless of the head position at any track. As previously described briefly, the bent angle θB as shown in FIG. 6 is needed for keeping the head height at constant. However, the bent angle θB causes azimuth loss while reproducing. The reproducing output may be decreased. As the result, the reproduced position signal may be deteriorated so that the jitter may be generated on the referenced clock for PLL. It becomes difficult to detect the peak of reproducing signal and causes some problem. To resolve this problem, another embodiment is described in FIG. 7. Similar to the embodiment shown in FIG. 4, the servo marking SM is formed in the region surrounded by the magnetic gap line 41 and track. However, it is not formed along the moving locus 21. Instead, it provides a magnetic disk with the servo pattern (so-called azimuth-zero-pattern) which is located along a curve. The curve always meets the head gap line at its center regardless of where the head position of the pivotal arm with the bent angle θB is located on a radius of the disk.

Figure 8A:
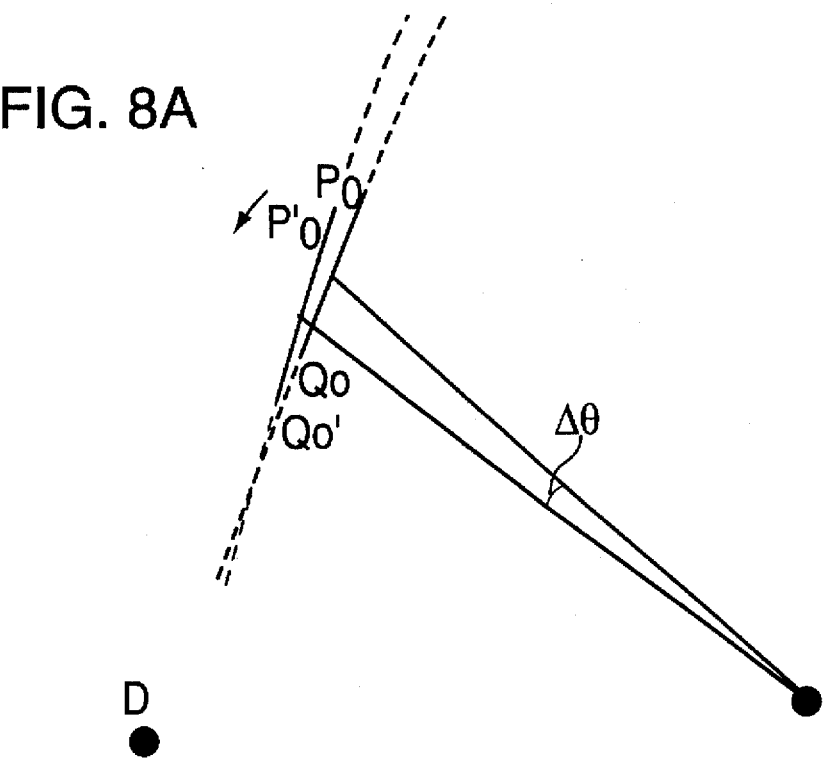
FIGS. 8A and 8B are drawings explaining how to draw a curved line in the another embodiment of the present invention.
Figure 8B:
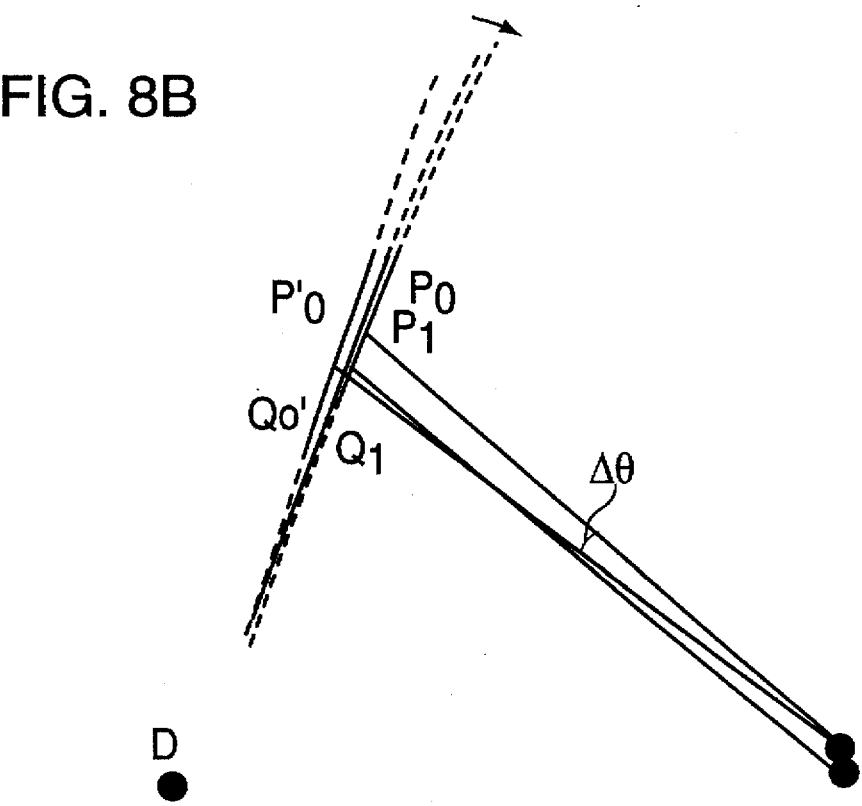

With the drawings in FIGS. 8A and 8B, it is explained how the curve is represented by the approximate polygonal lines. In these drawings, (PQ) shows an extremely small stroke including the middle point of the gap on the magnetic gap line. When the head is located at the outer peripheral of disk, the stroke (PQ) and pivotal axis (A) of arm are respectively located at $P_o$, $Q_o$ and $A_o$. Then, the arm is pivoted around the pivotal axis $A_o$ with small angle Δθ. The $(P_oQ_o)$ moves to $(P_o'Q_o')$. Next, the whole arm (all points of P, Q and A) is rotated around the axis (D) of disk so that the point $P_o'$ can meet on the line $P_oQ_o$. After this small rotation, the points of P, Q and A are respectively located at $P_1$, $Q_1$ and $A_1$.

Then, the arm is pivoted around the pivotal axis $A_o$ with small angle Δθ, again. The $(P_1Q_1)$ moves to $(P_1'Q_1')$. Next, the whole arm (all points of P, Q and A) is rotated around the axis (D) of disk so that the point $P_1'$ can meet on the line $P_1Q_1$. After this small rotation, the points of P, Q and A are respectively located at $P_2$, $Q_2$ and $A_2$.

The same operation is repeated by (n) times. Then, the arm is pivoted around the pivotal axis $A_n$ with small angle Δθ, again. The $(P_nQ_n)$ moves to $(P_n'Q_n')$. Next, the whole arm (all points of P, Q and A) is rotated around the axis (D) of disk so that the point $P_n'$ can meet on the line $P_nQ_n$. After this small rotation, the points of P, Q and A are respectively located at $P_{n+1}$, $Q_{n+1}$ and $A_{n+1}$.

The polygonal lines $P_o$, $P_1$, $P_2$, $P_3$, - - - $P_{n-1}$, $P_n$, $P_{n+1}$ can be thus obtained on the disk. Wherever the head is located on any radius, the polygonal lines become approximately tangent to the head gap line (PQ) while they are rotating and passing through the magnetic head. When the angle of rotation at each time ultimately approach to zero, the polygonal lines becomes the curve shown in FIG. 7.

In this embodiment, whenever the magnetic head 13 is located at the inner position (a), middle position (b) and outer position (c) of the magnetic disk 1, the servo marking SM can be arranged along the direction of magnetic gap at each position. Though it all depends on the distance between the disk center and pivotal axis and also the length of arm, the curve in this embodiment shown in FIG. 7 has "S" shape which slightly curves in the clockwise direction at the inner side and outer side with the middle position as its center.

In accordance with this embodiment, the azimuth loss can become zero by recording and reproducing with the magnetic head 13 having a certain bent angle θ. The clock mark CM and access code AC are also securely reproduced by the head.

Figure 9:
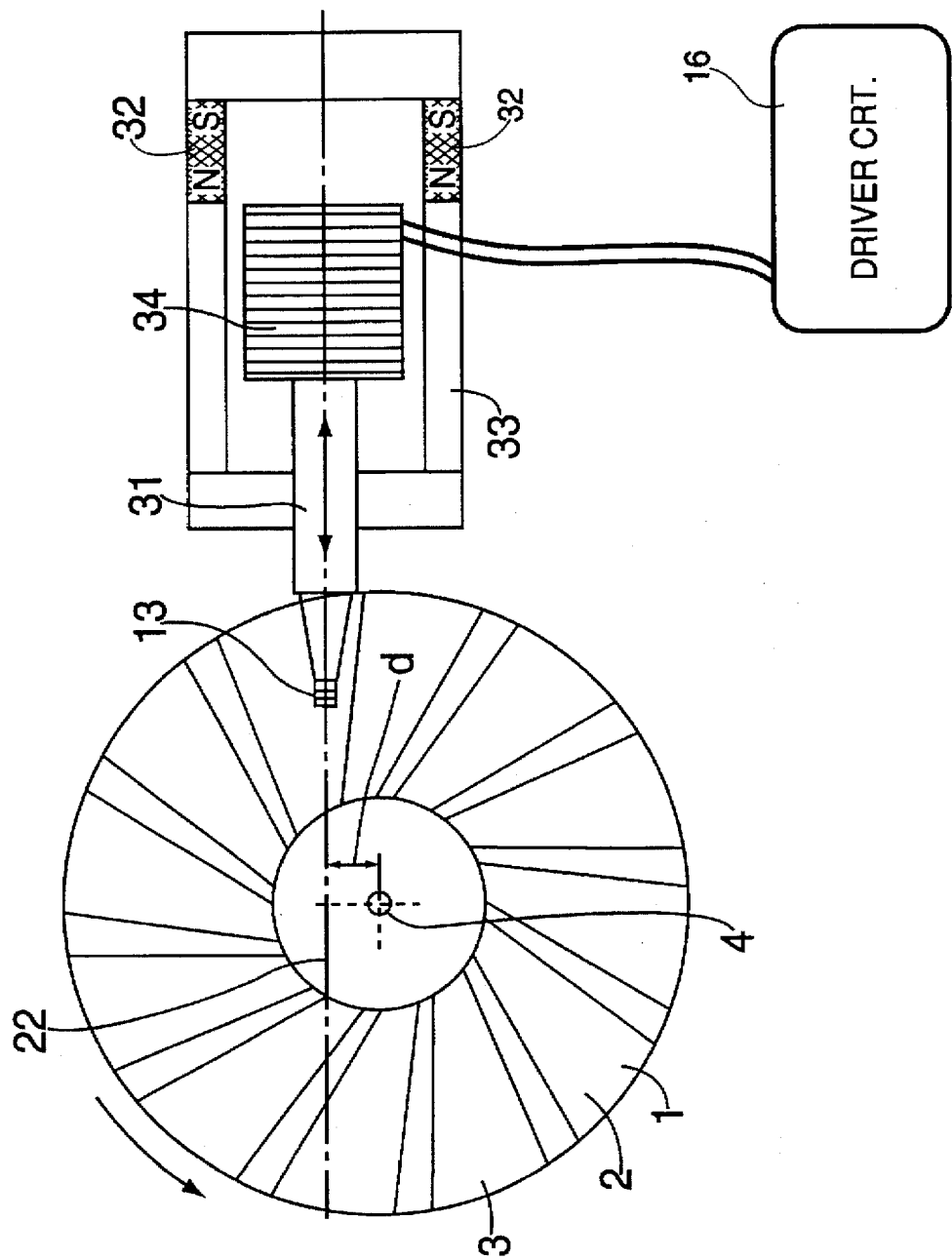
FIG. 9 shows a plan view of a magnetic disk as a further embodiment of the present invention.
Figure 15:
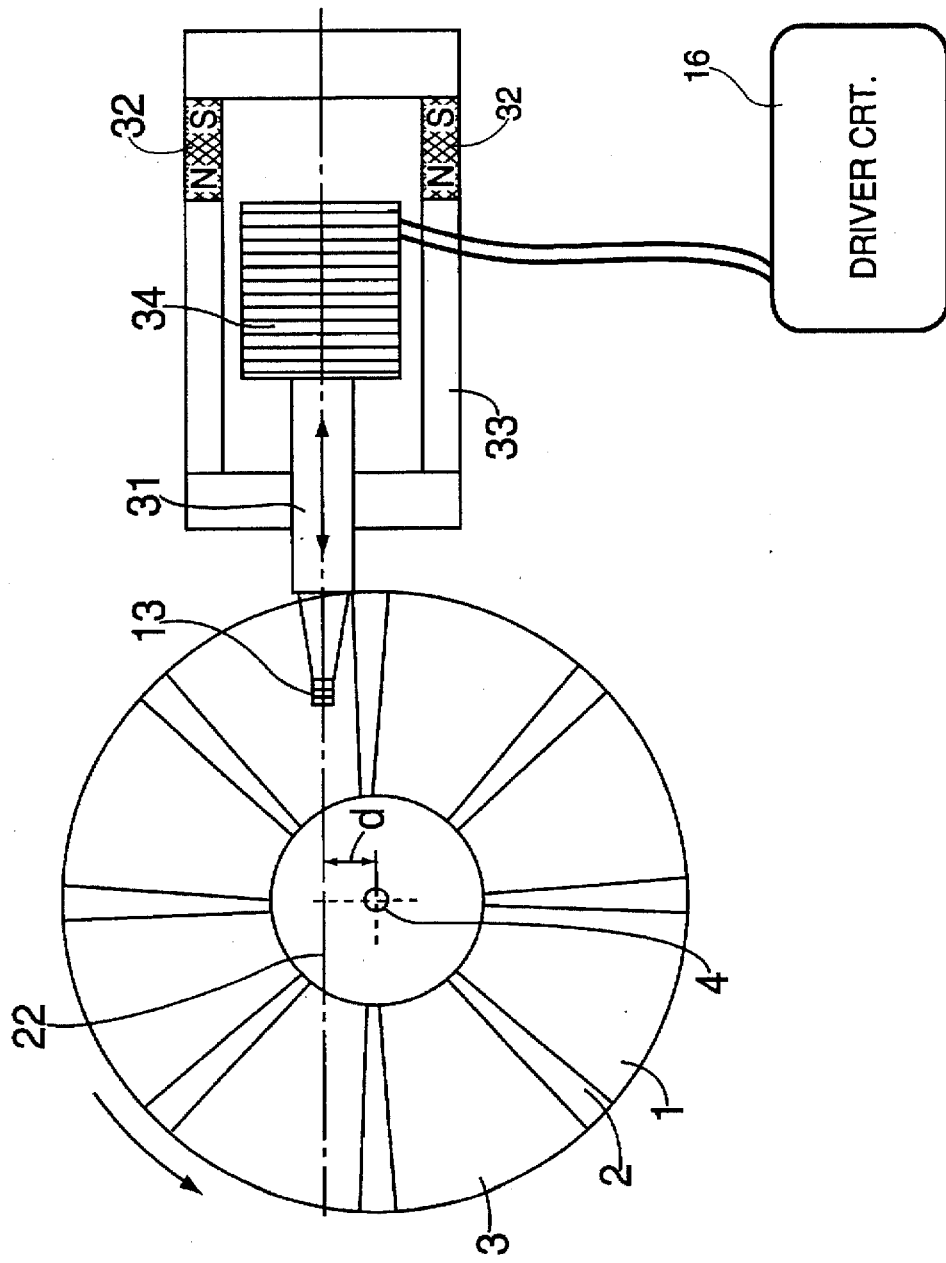
FIG. 15 shows a drawing explaining a method of writing and reading with the magnetic disk shown in FIG. 13.

FIG. 9 shows a further embodiment of the present invention. It includes the same numeral suffix on the corresponding portions as the previously proposed disk in FIG. 15. In this embodiment, the servo are 2 of magnetic disk 1 is formed along a line 22 which is offset from the center 4 with a distance (d). The exclusive region for such as each servo marking SM is formed similar to the examples shown in FIG. 2 to FIG. 4. This magnetic disk 1 is utilized for recording and reproducing with the magnetic head 13 which moves along the line 22. The bent angle θ may be also provided to the magnetic head 13 if necessary. The same effect can be also expected in this embodiment as the examples in FIG. 2 to FIG. 4 with the magnetic head 13 driven by the pivot arm.

Figure 10:
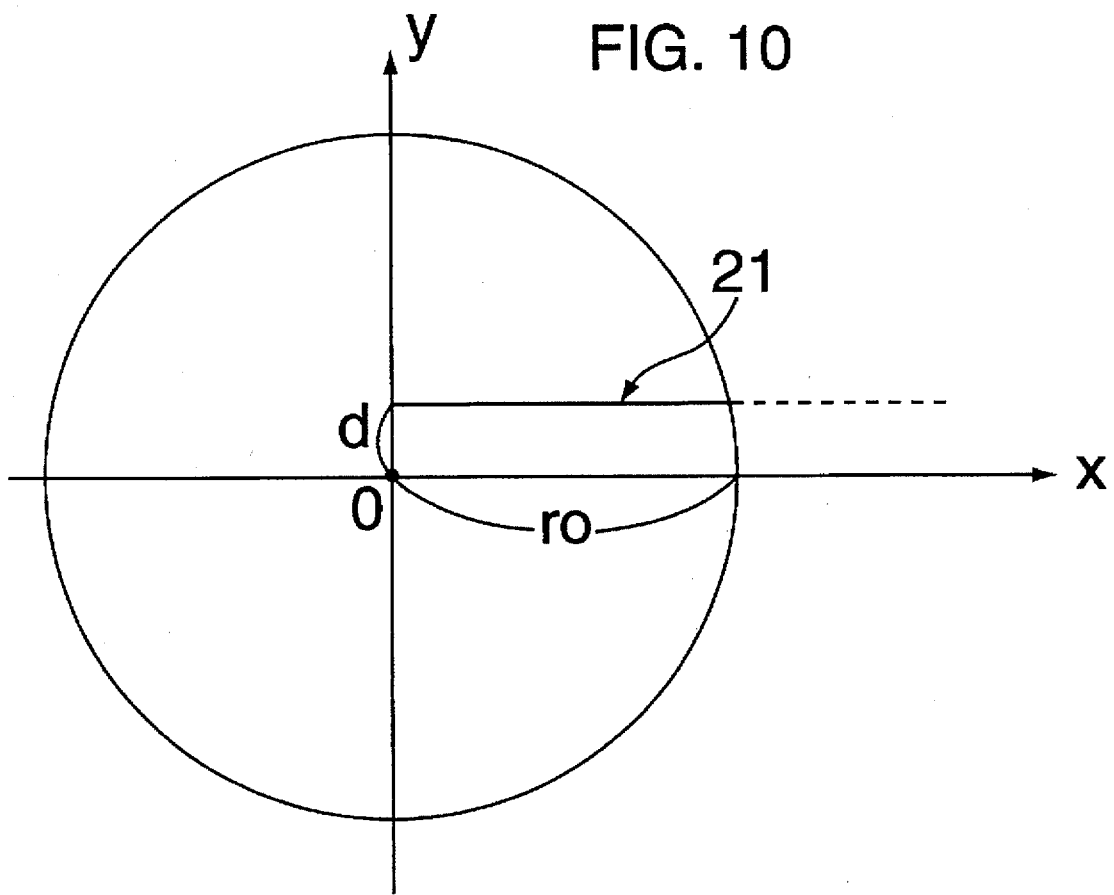
FIG. 10 shows another plan view of a magnetic disk as shown in FIG. 9 with X-Y coordinates.

FIG. 10 shows a plan view of the magnetic disk as shown in FIG. 9 with X-Y coordinates. The center of disk 1 is located at the origin. and the pivotal axis of arm 11 is located at $(X_o, 0)$. When the offset distance is given by (d), the head 13 moves along the line which is represented by [y=d], provided that $-r_o < d < r_o$ and $d \neq 0$. As an example, d=3.0 mm and $r_o=32.0$ mm with the most outer track at 30.0 mm and the most inner track at 16.0 mm.

Figure 11A:
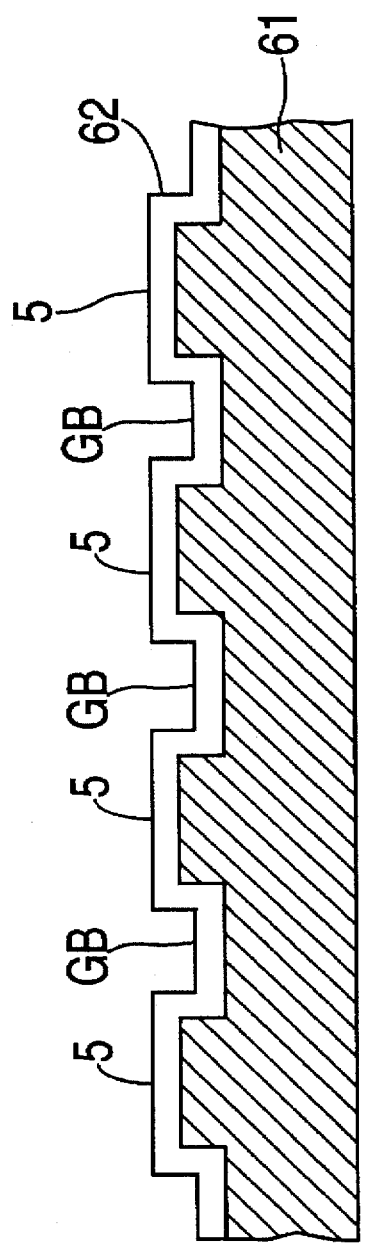
FIGS. 11A and 11B show sectional views of a magnetic disk of the present invention.
Figure 11B:
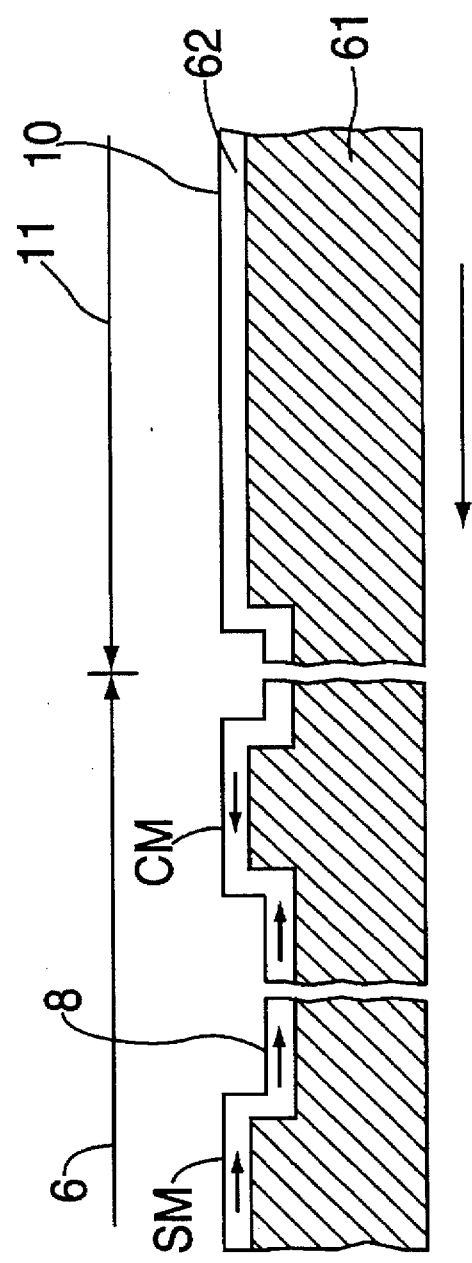

FIGS. 11A and 11B show sectional views of the magnetic disk 1 of the present invention. FIG. 11A shows a sectional view along a direction which is perpendicular to the track, and FIG. 11B shows another sectional view along the same direction as the track. As shown in the drawings, a substrate 61 which is made from synthetic resin has upper and lower portions. The surface of upper and lower portions is covered by a magnetic layer 62. The lower portion (concave portion) works as guard bands GB and the upper portion (convex portion) becomes the tracks.

The data area remains flat in each track as shown in FIG. 11B. On the other hand, only the portions to record servo marking SM and clock mark CM, etc. project in the servo area to have the same height as the data recording area. The non-recording area in which no servo signal is recorded is formed by the lower (convex) portion.

Such a magnetic disk can be manufactured by applying the optical disk technology. In other words, photo-resist should be first coated on the surface of a master glass plate. By using this photo-resist, a laser beam is irradiated to the only portions where the concave portion is required. After irradiating the laser beam, the photo-resist is removed and then only the exposed portion can be etched. Based on the master glass plate thus formed, a stamper is prepared for mass production of replica. The upper and lower portions in the master glass plate is then duplicated on the replica. By providing the surface of upper and lower portions with a magnetic layer 62, the magnetic disk can be completed as shown in FIGS. 11A and 11B.

The servo marking SM and clock mark CM in servo area is recorded by predetermined Direct Current Magnetization in a certain direction. For example, such a signal (or marking) can be recorded as follows. First, a low level current is supplied to a flying head. By scanning the flying head, the Direct Current Magnetization is performed in a certain direction on both of the concave portion (non-recording region) and the convex portion where the servo marking SM and clock mark CM can be recorded. Next, a relatively larger current is supplied to the flying head. The Direct Current Magnetization is performed only on the region where the servo marking SM and clock mark CM can be recorded in an opposite direction to the non-recording region.

Alternatively, it is possible to provide the magnetization in a different method. First, it makes slower the rotation of disk. The magnetic layer on both of the concave and convex portions in servo area are magnetized in a certain direction by the flying head which has a smaller floating height. Then, it makes faster the rotation of disk. The Direct Current Magnetization is performed only on the convex portion in servo area in an opposite direction to the concave portion.

Figure 12A:
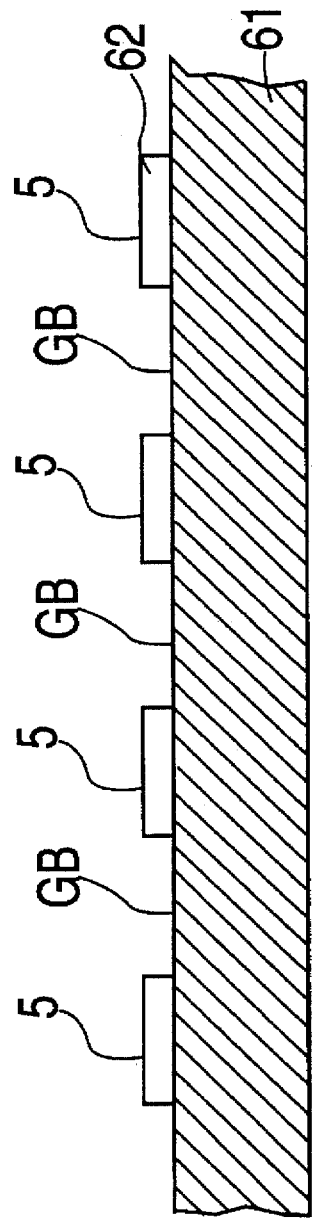
FIGS. 12A and 12B show sectional views of another magnetic disk of the present invention.
Figure 12B:
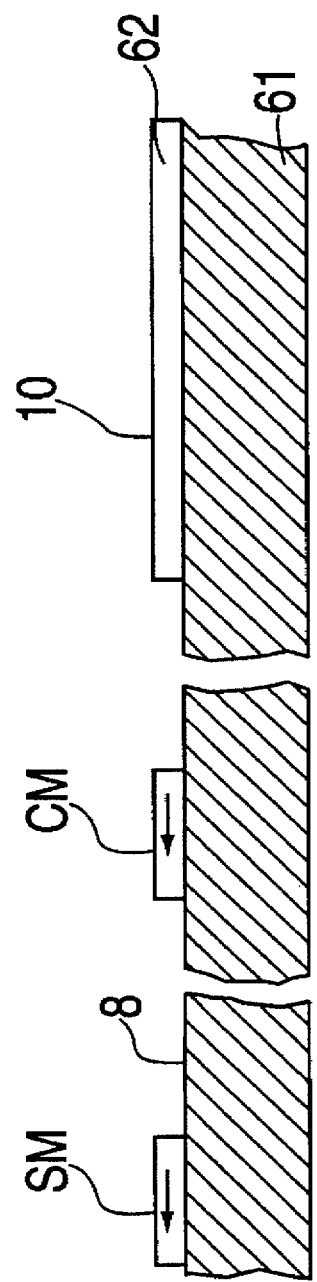
Figure 13:
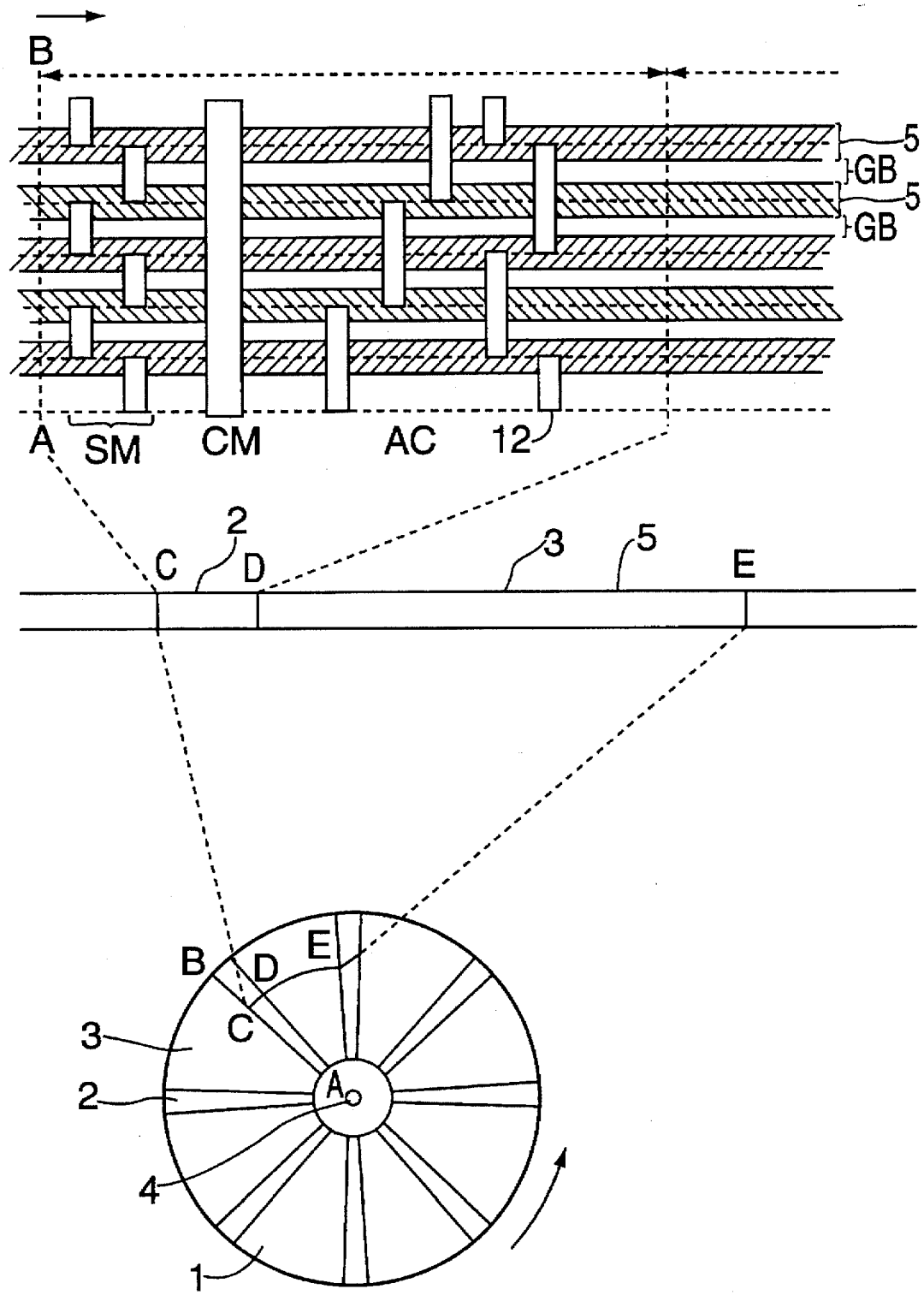
FIG. 13 shows a format of a magnetic disk which has been previously proposed.
Figure 14:
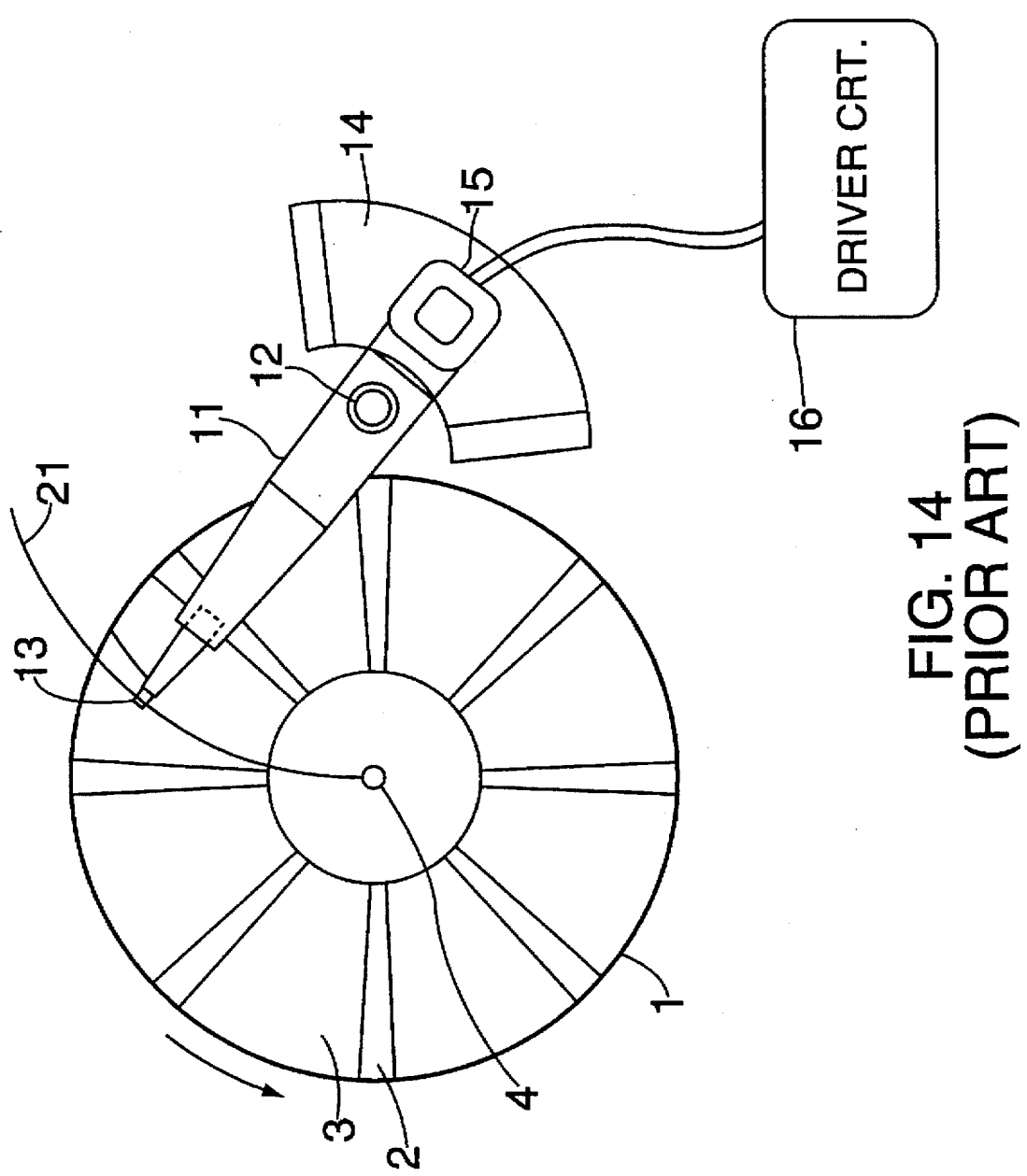
FIG. 14 shows a drawing explaining a method of writing and reading with the magnetic disk shown in FIG. 13.

FIGS. 12A and 12B show sectional views of the magnetic disk 1 as another embodiment of the present invention. A substrate 61 is formed flat and a magnetic layer 62 is formed thereon. Portions for the guard bands or the non-recording region are removed by etching for example. Other than that, the magnetic layer 62 can be coated by utilizing the printing technology. In this embodiment, the servo signal can be recorded by providing magnetization in a certain direction on the magnetic layer in servo region.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A magnetic disk adapted to be read with a magnetic head which is attached to a pivotable arm, the axis of said pivotable arm being located outside the periphery of said magnetic disk, said magnetic head defining a moving locus across said magnetic disk as said pivotable arm pivots about said axis, said magnetic disk comprising a recording medium having a plurality of tracks and guard bands concentric to the center of said magnetic disk, said tracks having a greater elevational height measured from the plane of said magnetic disk than said guard bands, each of said tracks including servo areas to record a servo signal and data areas to record a data signal, wherein each of said servo areas is located along said moving locus.

2. The magnetic disk of claim 1, wherein each of said servo areas comprises servo markings, said servo markings being defined by said moving locus and an arcuate portion of the respective track associated with said servo markings.

3. The magnetic disk of claim 2, wherein said magnetic head and said magnetic disk define a magnetic gap therebetween, said magnetic gap having a magnetic gap line wherein said magnetic gap line is tangent to said moving locus.

4. The magnetic disk of claim 1, wherein each of said servo areas comprises servo markings, wherein said servo markings are defined by radii of said magnetic disk and an arcuate portion of the respective track associated with said servo markings.

5. The magnetic disk of claim 1, wherein said magnetic head and said magnetic disk define a magnetic gap therebetween, said magnetic gap having a magnetic gap line wherein said magnetic gap line and said moving locus define a first angle, and wherein each of said servo areas comprises servo markings, said servo markings being defined by said magnetic gap line and by an arcuate portion of the respective track associated with said servo markings.

6. A magnetic disk adapted to be read with a magnetic head which is attached to a pivotable arm, the axis of said pivotable arm being located outside the periphery of said magnetic disk, said magnetic head defining a moving locus across said magnetic disk as said pivotable arm pivots about said axis, said magnetic disk comprising a recording medium having a plurality of tracks and guard bands concentric to the center of said magnetic disk, and said tracks having a greater elevational height measured from the plane of said magnetic disk than said guard bands, each of said tracks including servo areas to record a servo signal and data areas to record a data signal, wherein said magnetic head has a magnetic gap which defines a magnetic gap line, wherein radially adjacent servo areas plot a line which defines a curve to which said magnetic gap line is tangent in each track of said magnetic disk.

7. A magnetic disk having an axis through the center thereof, said magnetic disk being adapted to be read with a magnetic head which is attached to a pivotable arm which is adapted to rotate about said magnetic disk axis and to pivot about an axis of said pivotable arm, said pivotable arm axis being located outside the periphery of said magnetic disk, said magnetic head defining a moving locus across said magnetic disk as said pivotable arm pivots about said pivotable arm axis, said magnetic disk comprising a recording medium having a plurality of tracks and guard bands concentric to the center of said magnetic disk, said tracks having a greater elevational height measured from the plane of said magnetic disk than said guard bands, each of said tracks including servo areas to record a servo signal and data areas to record a data signal, wherein said magnetic head and said magnetic disk define a magnetic gap therebetween, said magnetic gap having a magnetic gap line, wherein as said pivotable arm pivots about said pivotable axis arm and routes about said magnetic disk axis, a discrete portion of said magnetic gap line traces out a curve defining said servo area, said curve intersecting said magnetic gap line at the center of said magnetic gap line.

8. A magnetic disk adapted to be read with a magnetic head which travels across said disk along a moving locus which extends across said disk in a radial and peripheral direction, said magnetic disk having a plurality of tracks and guard bands concentric to the center of said magnetic disk, said tracks having a greater elevational height measured from the plane of said magnetic disk than said guard bands, each of said tracks including servo areas to record a servo signal and data areas to record a data signal, wherein each of said servo areas is located along said moving locus of said magnetic head.

9. The magnetic disk of claim 8, wherein said moving locus comprises a secant of said magnetic disk, wherein said secant is offset from the center of said disk by a preselected distance.

10. The magnetic disk of claim 9, wherein said secant is parallel to a diameter of said magnetic disk.

* * * * *